United States Patent [19]

Schreiber et al.

[11] 4,268,861
[45] May 19, 1981

[54] IMAGE CODING

[75] Inventors: William F. Schreiber, Cambridge; Donald E. Troxel, Belmont, both of Mass.

[73] Assignee: Massachusetts Institute of Technology, Cambridge, Mass.

[21] Appl. No.: 943,523

[22] Filed: Sep. 18, 1978

[51] Int. Cl.³ .............................................. H04N 7/12
[52] U.S. Cl. ........................................ 358/138; 375/1
[58] Field of Search ...................... 358/133, 135, 138; 325/40, 42, 59, 65; 375/1

[56] References Cited

U.S. PATENT DOCUMENTS

| | | | |
|---|---|---|---|
| 3,035,121 | 5/1962 | Schreiber | 358/133 |
| 3,244,808 | 4/1966 | Roberts | 358/133 |
| 3,562,420 | 2/1971 | Thompson | 358/138 |
| 3,679,821 | 7/1972 | Schroeder | 358/133 |

OTHER PUBLICATIONS

Kretzmer-Reduced Alphabet Representation of TV Signals-Conv. Rec., vol. 4, pp. 140-153, 1956.
Kimme-Synthesis of Optimal Filters for Feedback Quantization System-IEEE Trans. on Cir. Theory, pp. 405-413, 1963.
Brainard-Subjective Evaluation of PCM Noise-Feedback Coder for TV-Proc. IEEE, vol. 55 #3, Mar. 1967, pp. 346-353.
Brainard et al.-Direct Feedback Coders: Des. & Performance With TV Signals-Proc. of IEEE, vol. 57 #5, May 1969, pp. 776-786.
Schreiber-Picture Coding-Proc. IEEE, vol. 55 #3, Mar. 1967, pp. 320-330.
Roberts-PCM Television BW Reduction Using Pseudorandom Noise Thesis MIT Dept. of Elect Eng., Feb. 1961.
Roberts-Picture Coding Using Pseudo-Random Noise-IEEE Trans. Prof. GP on Info. Theory, IT 8:2, Feb. 1962, pp. 145-154.
Curlander-Image Enhancement Using Digital Adaptive Filtering Thesis MIT Dept. of E.E., Aug. 1977.

Primary Examiner—Joseph A. Orsino, Jr.
Attorney, Agent, or Firm—Arthur A. Smith, Jr.; Robert E. Hillman

[57] ABSTRACT

Processing of digitally-coded pictures to improve perceived quality without increasing transmission channel capacity, featuring dividing the video signal into a low, middle and high frequency signals (16, 26), finely quantizing the low frequency signal (18), adding pseudo-random noise (33) to the middle frequency signal prior to quantizing (28), enhancing (36) and adding pseudo-random noise (48) prior to coarsely quantizing (50) the high frequency signal. The pseudo-random signals are subtracted (37, 52) from the respective signals at the receiver.

34 Claims, 13 Drawing Figures

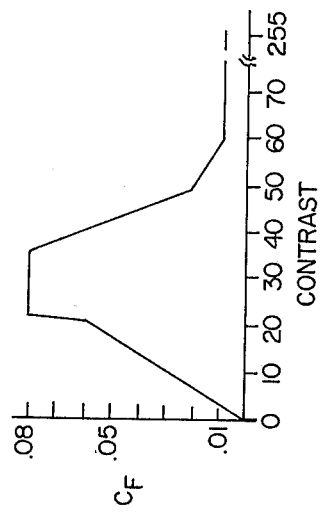
FIG 3
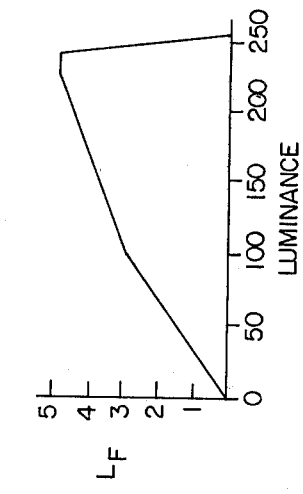
FIG 4
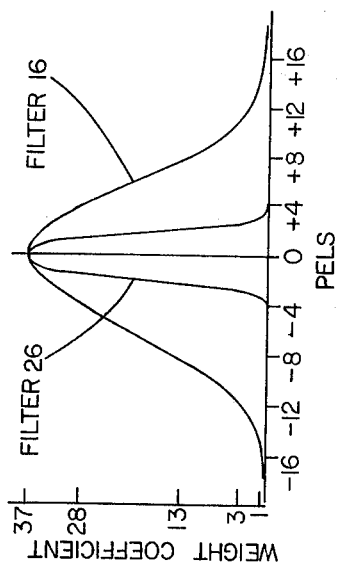
FIG 2
FIG 5
FIG 6
FIG 7
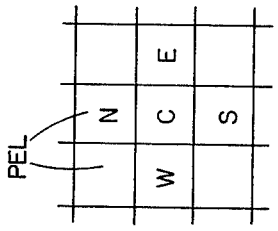

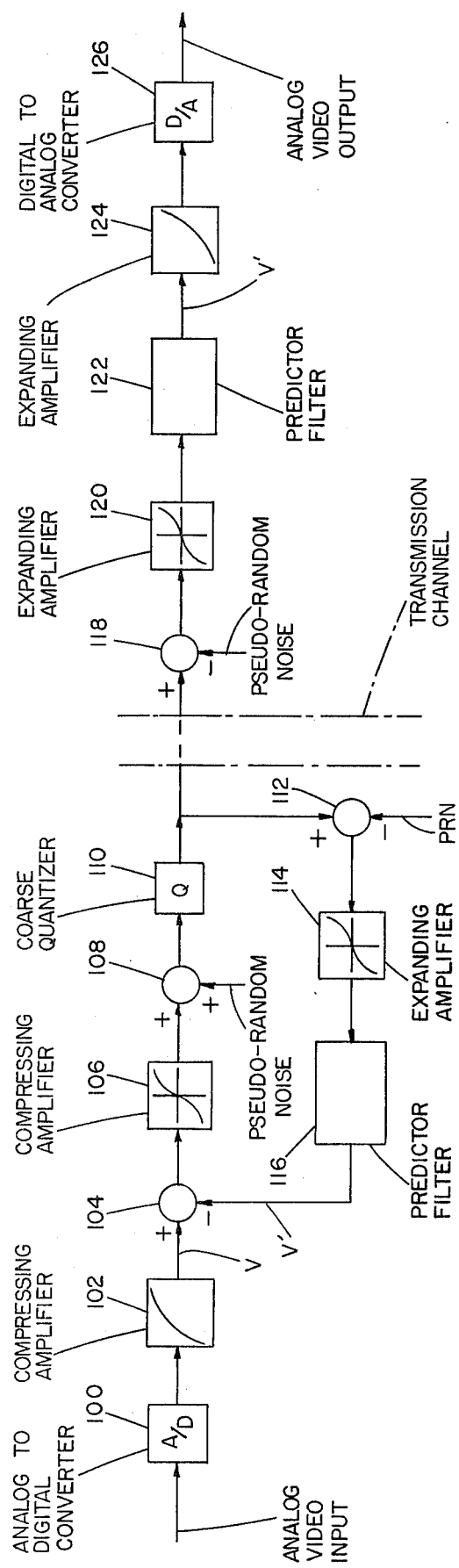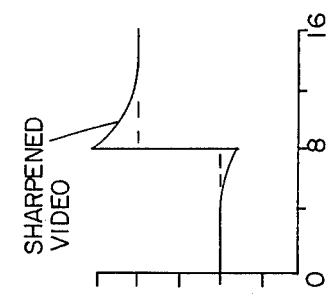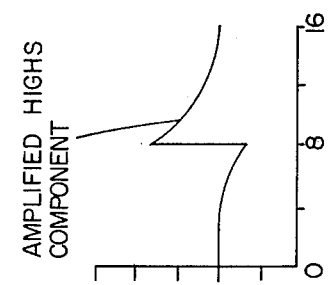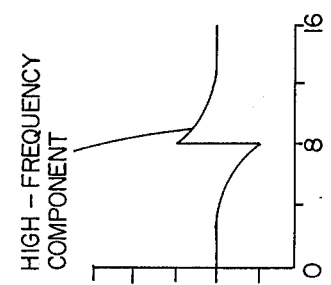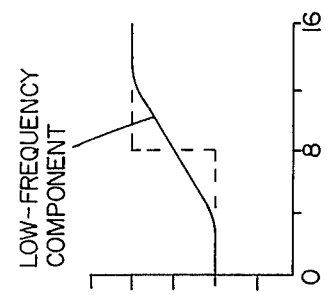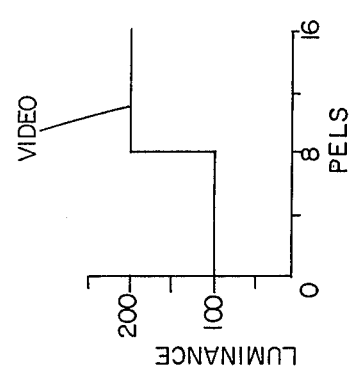

IMAGE CODING

FIELD OF THE INVENTION

This invention relates to digital coding of visual pictures.

BACKGROUND OF THE INVENTION

In transmitting digitally-coded representations of visual images, such as in television, it is desirable from a cost standpoint to minimize the number of bits of information transmitted without materially degrading image quality. Reducing the number of bits reduces the required channel bandwidth, the dominant cost factor in communication systems. Visual images are transmitted by first producing an analog video signal composed of a voltage level proportional to measured luminance at each of many small picture elements uniformly distributed across the image and then digitizing the analog signal by assigning the closest quantization level to each picture element. Generally if too few quantization levels are used, the received picture exhibits so-called quantization noise, e.g., coarse and unpleasing contours caused by rounding off intermediate luminance values to the closest quantization level.

One technique for avoiding the contours, suggested in Roberts, L. G. "PCM Television Bandwidth Reduction Using Pseudo-Random Noise", Thesis, M.I.T. Dept. of Electrical Engineering, February 1961, is to add pseudo-random noise having a maximum amplitude of plus or minus half a quantization level to the digitized signal before quantization and subtract the noise thereafter. This tends to randomize the rounding off process and replace the well-defined contours with regions wherein there are frequent random shifts between quantization levels, producing a perceived gradual variation between levels. This procedure effectively replaces the quantizing noise by a more acceptable random noise throughout the image.

Another procedure is to use spatial filters to separate the video signal into high and low spatial frequency components to allow subsampling and fine quantization of the lows channel, thus avoiding the spurious contours, and to allow coarser quantization of the highs channel, where more quantization noise is tolerable because noise introduced there shows up for the most part in high detail areas where it is less visible. Very coarse quantization of the highs channel, i.e., four to eight levels, does, however, leave visible artifacts.

Another procedure is to compress (nonlinearly attenuate) the luminance signal before quantization and expand it after to convert it to what is known as a lightness scale on which the human eye has approximately uniform sensitivity to luminance perturbations and noise, thus assuring that quantizing noise will be equally visible in both dark and light portions of the picture. The same procedure, sometimes referred to as tapered quantization, has also been used for a similar purpose in a separate high-frequency channel, making quantizing noise more equally visible in both low and high contrast areas.

Finally, differential quantization or DPCM is used to transmit essentially the differential of the video signal, with the receiver integrating to restore the original signal. DPCM does not exhibit the spurious contours of coarsely-quantized PCM, given the same number of bits/sample. However, in designing differential systems a trade off is necessary between the ability to accurately reproduce sharp edges in a picture without blurring and the intensity of echoes at these edges and the amount of image granularity caused by quantization errors in sending low-frequency information in differential form.

Another related technique for improving picture quality is to emphasize edge contrast by what is known as sharpening, in which the high-frequency component described previously is amplified before it is added to the lows channel. Because sharpening tends to emphasize inherent noise in a picture and also to produce its own artifact bands on either side of over-sharpened edges, it is known to make the degree of sharpening dependent on local luminance and contrast, generally providing more sharpening in bright than in dark areas and in midrange rather than very low or high contrast areas. This avoids noise emphasis in areas of uniform luminance where noise is most visible, and it avoids sharpening already sharp edges. Curlander, P. J., "Image Enhancement Using Digital Adaptive Filtering", Thesis, M.I.T. Dept. of Electrical Engineering, August 1977.

An article by E. R. Kretzmer, "Reduced-Alphabet Representation of Television Signals", Conv. Rec., Vol. 4 pp. 140-153, 1956, shows dividing the video signal into low and high-frequency components (or more than two components), coarsely quantizing with tapered step sizes the high-frequency component, and finely quantizing and subsampling the low-frequency component. Low-pass filters and subtractors were suggested as a means of producing the separate components. Kretzmer recognized that picture areas of fine detail are more immune to the effects of quantizing than are areas of uniform-luminance.

SUMMARY OF THE INVENTION

Our invention provides a means of greatly improving the perceived quality of digitally-coded pictures without increasing the amount of information or number of bits transmitted or recorded.

In one aspect the invention features dividing the video signal into low and high-frequency components and adding pseudo-random noise only to the high-frequency component before coarsely quantizing it. Because the noise is injected only into the high-frequency channel, its effects appear principally in image areas of high detail where the effects are less visible. In preferred embodiments, the low-frequency component is subsampled and finely quantized to avoid spurious contours; a middle-frequency component is produced; the middle component is attenuated by a level detector in regions of low middle-frequency signal level; pseudo-random noise is added to the middle-frequency component before quantization; the high frequency component is selectively amplified to more greatly sharpen areas of mid-range contrast and high luminance and it is greatly attenuated in uniform-luminance areas where there is very low average gradient or contrast to prevent artifacts produced by the quantizing and pseudo-random noise from appearing in uniform luminance areas, where they are most visible; band-pass filters are employed in the decoder to remove the off-band frequency residual effects of the pseudo-random noise; the high-frequency and middle-frequency components are companded to equally spread the visibility of quantizing noise across all contrast levels; the entire video signal is companded to convert it to a lightness scale; and, in differential quantizers, the difference signal is companded.

In another aspect, applicable to DPCM, the invention features adding pseudo-random noise before quantizing the difference between the video signal and a prediction signal obtained by filtering the quantized difference signal, the injected noise being subtracted before filtering. In this aspect the invention greatly reduces the edge echoes and image granularity conventionally present in differential quantization and thereby allows the coder to be optimized for better edge reproduction.

DESCRIPTION OF THE PREFERRED EMBODIMENT

We turn now to description of preferred embodiments and their operation, after first briefly describing the drawings.

DRAWINGS

FIG. 2 shows the shape of the two-dimensional spatial low-pass filters of FIG. 1.

FIG. 3 is a graph of the nonlinear relation between the luminance scale factor $L_F$ and luminance.

FIG. 4 is a graph of the nonlinear relation between the contrast scale factor $C_F$ and contrast.

FIG. 5 shows the algorithm for computing the average gradient at a given picture element from the luminance of the four surrounding pels.

FIG. 6 shows the contrast smoothing filter.

FIG. 7 shows the eight-by-eight building block for structured dither noise.

FIG. 8 is a block diagram of another preferred embodiment of the invention, showing its application to differential PCM (DPCM) coding.

FIGS. 9a–9e are a diagrammatic representation in one dimension of the low and high-frequency components and the effects of sharpening for a step change in luminance.

EMBODIMENTS

Figure 1:
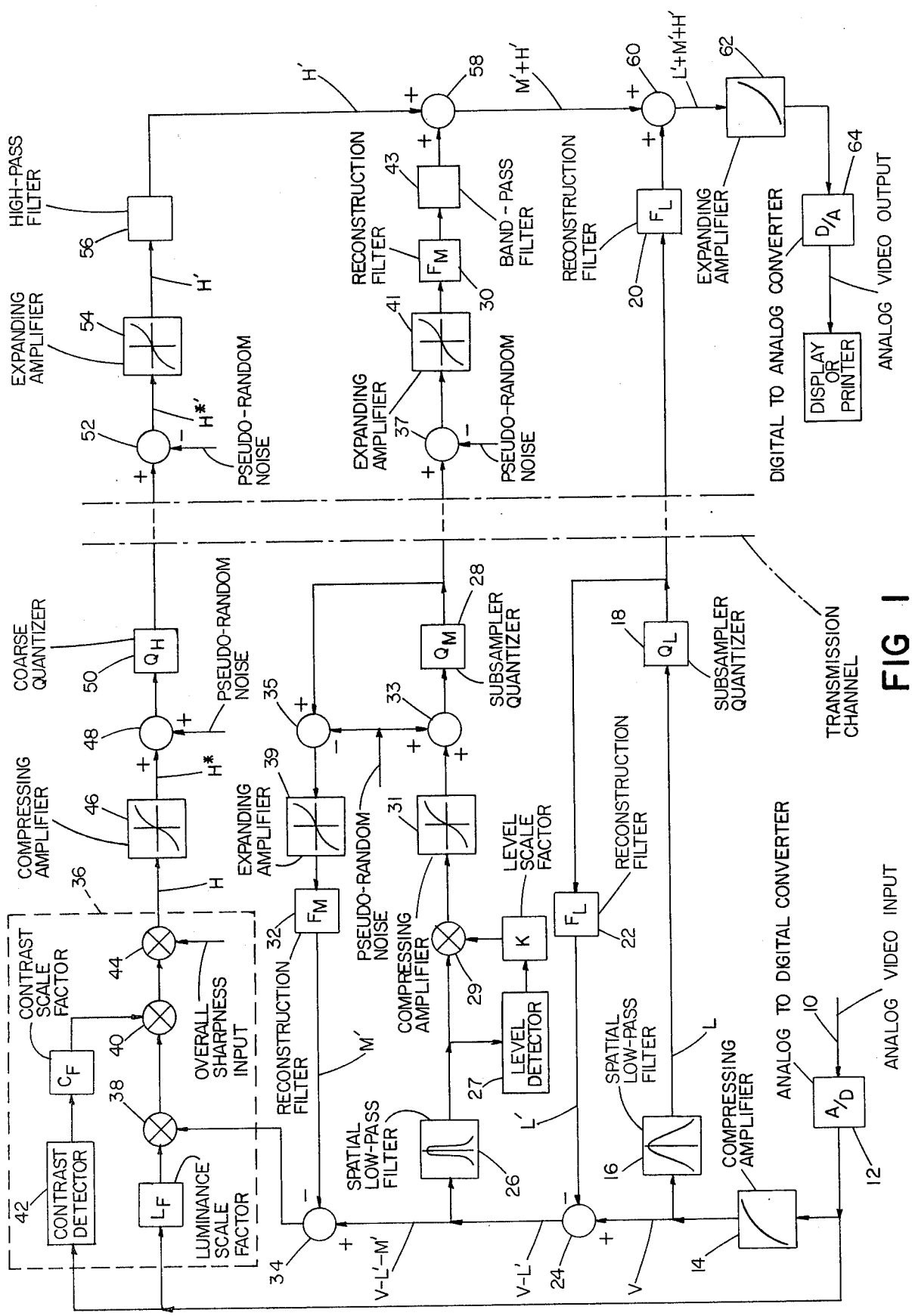
FIG. 1 is a block diagram of a preferred embodiment of the invention.

There is shown in FIG. 1 a system for coding and decoding visual pictures. Analog video input 10 consists of a voltage level proportional to picture luminance for each of many finely spaced picture elements ("pels"). Video signal 10 can be the output of a television camera, laser scanner or other device. For example, a Laser-photo scanner (manufactured by Harris Corporation) scans a picture at a density of 111 lines per inch and 106 pels per line; for an 8 inch by 10 inch picture, approximately 1 million pels are generated.

The analog video input is digitized by analog to digital converter 12 at 8 bits (256 levels) per pel. Nonlinear amplifier 14 compresses the digitized input to convert it to a "lightness" scale on which the human eye has approximately uniform sensitivity to luminance perturbations or noise (i.e., a spot only a few lightness levels different from its surroundings will be equally perceived in both bright and dark portions of the picture). Amplifier 14 follows a half-power curve, i.e., lightness levels are approximately proportional to the square root of luminance levels.

The video lightness signal V is divided for transmission into low, middle and high spatial frequency signals. To produce the low-frequency signal, the full signal V is digitally filtered using a two-dimensional spatial low-pass filter 16 which substitutes at each pel a weighted average of the lightness levels of surrounding pels out to a radius of 16 pels. Weight coefficients for filter 16 are plotted on the graph in FIG. 2. Unity D.C. gain is preserved by dividing the weighted sum by the total of the coefficients. The filtered output L of filter 16 is subsampled at block 18, and then transmitted to the receiving station using a single 8 bit digital code for each said subsample. The spacing between subsampled picture elements must be chosen in accordance with the dimensions of low-pass filter 16 which sets the upper limit on spatial frequency in the filtered signal.

Enough over-sampling is done to prevent aliasing (formation of Moire patterns in the received image). At the receiver, reconstruction filter 20 uses an interpolation process to very closely restore the original low-frequency signal components.

To produce the middle-frequency signal, low-frequency signal L' is produced by reconstruction filter 22 which is identical to filter 20 and is subtracted from the video lightness signal V at summer 24. The difference, which represents the middle and high-frequency content of the picture, is passed through two-dimensional spatial guassian low pass filter 26 which is similar in operating characteristics to filter 16 but of smaller pel radius. The shape of filter 26 is shown in FIG. 2. At each pel lightness levels of surrounding pels out to a radius of 4 pels are weighted by the coefficients shown and the sum is divided by the sum of the coefficients, to give unity D.C. gain. The filtered middle-frequency signal M is then multiplied by level scale factor K at multiplier 29. Level detector 27 averages the level of the middle-frequency signal over a region two to three times the reciprocal spatial frequency bandwidth of the middle channel. Level scale factor K is approximately proportional to contrast for low detected level values, being zero for zero detected level, and is unity for high detected levels. After being multiplied by the level scale factor, the middle-frequency signal is nonlinearly amplified at compressing amplifier 31. Pseudo-random noise is then added to the compressed signal at summer 33, and the signal is subsampled and quantized at block 28, the subsampling block size being one-sixteenth the area of that of subsampler 18 because of the higher frequency content of the middle frequency signal. In both the receiver and transmitter, pseudo-random noise is subtracted at summers 35, 37, and the signal is expanded by expanding amplifiers 39, 41, and reconstructed by reconstruction filters 30, 32, respectively. Band-pass filter 43 in the decoder removes off-band residuals produced by introduction of the wide-band pseudo-random noise. At summer 34 the difference is computed between the output (V−L') of summer 24 and the output M' of reconstruction filter 32. The difference (V−L'−M') represents the high-frequency content of the picture.

The high frequency signal produced at summer 34 is processed through sharpener 36. The signal is multiplied at multipliers 38, 40 by luminance scale factor $L_F$ and a contrast scale factor $C_F$, respectively. The luminance and contrast factors vary nonlinearly with luminance and contrast as shown by the curves of FIGS. 3 and 4, respectively. Luminance is the output of analog to digital converter 12. Contrast is measured at block 42 by computing an approximation to the absolute value of the gradient at each pel and smoothing the resultant gradient picture. The gradient is approximated by averaging at each pel the vertical and horizontal differences in luminance between vertically and horizontally adjacent pels, as shown by the equations and diagram of FIG. 5. Smoothing is accomplished by twice filtering the gradient picture with the constant height, roughly circular filter of FIG. 6. Smoothing of the gradient picture is necessary to assure that the contrast scale factor $C_F$ does not very substantially across the width of an edge. An overall sharpness adjustment can be made at multiplier 44.

The sharpened high frequency signal H is nonlinearly amplified at compressing amplifier 46, according to the half-power function:

$$H^* = (R + 1)\frac{H^{\frac{1}{2}} - 1}{R^{\frac{1}{2}} - 1} + 1$$

where $H^*$ is the compressed high frequency signal and R is the maximum edge range in the picture, R varying upto a maximum of 128. Pseudo-random noise is added to compressed signal $H^*$ at summer 48. The noise has a peak-to-peak amplitude the size of one quantization step of quantizer 50. Noise amplitudes vary between plus and minus one-half a quantization step and have a zero mean value and uniform probability distribution. The noise is generated using either the well-known method of generating successive random number sequences by register shifting or using an optimally structured noise pattern consisting of a dither pattern developed especially for minimizing its appearance in pictures. The dither pattern is described in Limb, "Design of Dither Waveforms for Quantized Visual Signals," Bell System Technical Journal, 48, pp. 2555-2582, September 1969; Lippel et al., "Ordered Dither Patterns for Coarse Quantization of Pictures," Proc. IEEE, 59:3, pp. 429-431, March 1971; and Bayer, "An Optimum Method for Two-Level Rendition of Continuous-Tone Pictures," IEEE International Conference on Communications, Vol. I, pp. 26-11 through 26-16, 1973.

The 8-bit output of summer 48 is coarsely quantized at block 50, using either two (four levels) or three (eight levels) bits for each pel. No subsampling is done. A suitable dither pattern for two bit quantization is shown in FIG. 7 for an eight by eight pel block. The same pattern is repeated across the entire picture. The values vary between +32 and −32, which is plus or minus one-eighth of 256 or one-half a quantization level in a 2 bit signal. Alternatively a long sequence random noise as suggested by Roberts can be used.

After transmission the identical pseudo-random noise pattern added at summer 48 is subtracted at summer 52, and expanding nonlinear amplifier 54, the compliment of amplifier 46, restores the shape of the high frequency signal. Amplifier 54 performs the function:

$$H' = \left[\frac{H^{*} - 1}{R + 1}(R^{\frac{1}{2}} - 1) + 1\right]^2$$

To remove any residual DC or low-frequency information introduced by either nonlinear amplifiers 46, 54 or the pseudo-random noise, the high frequency signal H' is processed by high-pass filter 56.

Finally, the low, midband, and high frequency signals are summed at summers 58, 60; the sum is expanded by nonlinear amplifier 62 to convert from a lightness to a luminance scale; and the signal is converted back to analog for display or printing of the received picture. Display or printer 64 could be a half-tone printer.

Turning to FIG. 8 there is shown a second embodiment employing differential pulse code modulation (DPCM). The analog video input is converted to an 8-bit digital signal at block 100 and then compressed by nonlinear amplifier 102 to shift to the lightness scale. The output of summer 104, which computes the difference between the video input and a feedback signal, is compressed by nonlinear amplifier 106 having the same characteristics as amplifier 46 in FIG. 1. Pseudo-random noise similar to that described in connection with FIG. 1 is added to the compressed difference signal at summer 108, and the composite signal is coarsely quantized at block 110. The coarsely quantized output is fed back through expanding amplifier 114, which has the characteristics of amplifier 54 in FIG. 1, and predictor filter 116, which averages the instant luminance value with values from previous pels. Filter 116 may simply substitute the luminance value from the previous pel. After transmission, amplifier 120 and filter 122, identical to amplifier 114 and filter 116, are used to reproduce the feedback signal V' which is an approximation to video input V. Expanding amplifier 124 converts the received signal back to the luminance domain, and block 126 converts the signal to analog form for display. Amplifiers 100, 124 are identical to amplifiers 14, 62, respectively, in FIG. 1.

In operation, the system of FIG. 1 first digitizes and compresses the analog video input to convert it to the lightness domain wherein noise is equally perceived at low and high luminance levels. The lightness domain input is then divided successively into low, middle, and high frequency components by using two spatial low-pass filters 16, 26 and summers 24, 34 to subtract the reconstructed subsampled filter outputs from the filter inputs. The low and middle-frequency signals are subsampled before transmission at small fractions of the pel density with enough oversampling provided to prevent aliasing.

The middle-frequency signal is further processed before subsampling to reduce inherent noise in the video signal and quantization noise. multiplier 29 attentuates the signal in areas of low middle-frequency signal level, companding amplifiers 31, 41 equalize perception of noise between high and low contrast regions, and pseudo-random noise is added before and after quantization to randomize quantizing errors.

The high frequency signal is non-uniformly amplified at sharpener 36 both to enhance the contrast of edges and thereby improve perceived picture quality and to reduce the visible effect both of the noise added due to the course quantization of quantizer 50 and any noise which may be present in the high frequency component of video signal 10. This last effect comes about because the effective gain of the highs channel is decreased below unity in blank areas where the high frequency noise is most visible. Multiplier 29 performs a similar function in the middle-frequency channel. Low pass filter 16 prevents this signal noise from being transmitted through the low-frequency channel. The gradient computation of FIG. 5 and subsequent smoothing by the filter of FIG. 6 assures that perturbations only a few pels across produce a zero contrast measurement, which in turn gives constrast scale factor $C_F$ a zero value and thus high-frequency component H a zero value at the output of multiplier 40, all thereby preventing the undesired introduction of coding noise into uniform-luminance image areas. A further benefit from attenuating high-frequency noise in uniform-luminance area is that greater companding can be performed at amplifier 46 than could otherwise be done for the same picture quality.

Aside from attenuating these spurious high-frequency signals to zero, the sharpener also amplifies the high-frequency signals which occur in areas of mid-range contrast, as shown by the shape of the $C_F$ curve shown in FIG. 4. Already high contrast areas are left unaffected by the contrast scale factor so as not to produce the artifact bands (or "rabbit ears") which surround an over-sharpened edge.

In FIG. 9 there is illustrated the result of sharpening an ideal one-dimensional edge. The sharpened video of FIG. 9e is given overshoot on either side of the edge. The relative amount of overshoot is intentionally made greater on the bright side of the edge because the artifact bands are less visible in bright areas than in dark areas. The relative difference is achieved by making $L_F$, the luminance scale factor, proportional to luminance at the exact pel being sharpened. Thus $L_F$ shifts in value at the edge. The specific relations with luminance and contrast shown in FIGS. 3 and 4 represent the optimum found in a study conducted by Curlander, "Image Enhancement using Digital Adaptive Filtering," Thesis, M.I.T. Electrical Engineering and Computer Science Department, August 1977, which is hereby incorporated by reference.

Sharpened output H is companded to equalize perception of noise between low and high contrast edges. Pseudo-random noise is added to the companded signal before quantizing and subtracted after to convert the highly correlated quantizing noise to uncorrelated random noise, which is much less perceptible than the former for the same number of quantization levels. Injecting the noise makes the quantizer an unbiased estimator of the high-frequency component. By adding the pseudo-random noise only to the middle and high-frequency components, its visibility in the received picture is greatly reduced. Visual perception of noise varies approximately inversely to the degree of similarity in frequency content between the noise and the picture. Thus high-frequency noise is least visible in picture areas of high detail, e.g., at very sharp edges, and most visible in areas of uniform luminance. Because pseudo-random noise generally contains both high and low frequency components, high-pass filter 56 and band-pass filter 43 are used at the decoder to remove whatever off-band frequency components the noise leaves in the middle and high-frequency signals. The filtering does not reduce the benefit obtained from use of the noise; thus quantizing noise remains well hidden.

After the high frequency signal is expanded to restore proper edge magnitudes and is high-pass filtered to remove low frequency residuals introduced by coding, the low, middle, and high frequency signals are summed, expanded to the luminance domain, and converted back to analog for display.

Low pass filter 26 is given a 4 pel radius to maximize performance of sharpener 36. A 4 pel radius in the filter produces an 8 pel wide edge in the high frequency signal for a step change in the full video signal, as illustrated in FIG. 9. It turns out that such an edge width is optimal for sharpening; lesser or greater edge width causes mach bands (or "rabbit ears") to become visible at less than optimal sharpening levels. The optimum edge width of course depends on the scanning standards and would be different in other embodiments. Low pass filter 16 is selected to divide the remaining signal between the middle and low transmission circuits such that the minimum channel bit capacity is required for transmission and that the noise level in the low channel is substantially reduced over that present in video input 10.

When noise is present in the input signal, the system has the potential for noise reduction as well as sharpening since only the input noise of the lows channel appears in the final output in those relatively blank image areas where the contrast scale factor, and therefore the gain of the highs channel, is very low. These areas, of course, are just where the noise, if present, would be most visible. A three channel system, as disclosed here, has the potential for greater noise reduction as well as lower channel capacity than that of a two channel system. As mentioned previously, in a two channel system, the lows bandwidth is determined by the optimum shape of the highs signal from the standpoint of sharpening. But if the lows signal of the two channel system is itself divided into two channels, then the lowest channel can have less noise than that of the lows channel of the two-channel system, since its bandwidth can be less. Further, input noise may be suppressed in the middle channel by using separate level detector 27 and multiplier 29 to reduce the gain of the channel in areas where the signal in the middle channel is small.

Reduction in the required channel capacity in the three channel system comes about because the quantization noise in the middle channel, whether randomized by the addition and subtraction of pseudo-random noise or not, is less visible than an equal quantization noise in the two channel lows channel. Therefore fewer bits per sample are required for the same quality. The channel capacity required for the lowest channel is generally completely negligible compared to the other channels since the bandwidth, and therefore the required sampling density, is so low. Thus a large number of bits per sample can be used, reducing the quantization noise to invisibility, at little cost in channel capacity.

In operation of the DPCM system of FIG. 8, the difference between the compressed digital video signal V (8 bits per pel) and the predicted signal V' is compressed at block 106, summed with the pseudo-random noise at summer 108, and coarsely quantized (2 or 3 bits per pel) at quantizer 110. The predicted signal is computed by subtracting the interjected noise, then expanding, and then filtering at predictor filter 116, which integrates an average of the difference levels for one or more previous pels. This integrated average differential V' is an estimate of the next lightness level, and it is the difference between the actual value V and the estimated value V' which is quantized and transmitted. In an approximate sense, it is the differential of V that is transmitted. Unlike the system of FIG. 1, both low and high-frequency components of the video signal are here transmitted on a single channel. The low-frequency information is conveyed by sending short pulses, sometimes amounting in the quantized signal to a single bit disturbance for one or a small number of pels. The pulses are integrated at the decoder to change the D.C. or low-frequency lightness level. These pulses show up as a relatively sparsely spaced granularity in the received picture.

With DPCM a phenomenon known as slope overload can cause blurring of sharp edges in the picture. This occurs when the maximum capacity of quantizer 110 is exceeded momentarily by the large magnitude of the differential at the sharp edge. Conventionally it has not been possible to increase the effective gain of the quantizer sufficiently to eliminate this blurring because increasing gain brought on two other undesirable side effects. First, increased gain tends to cause more of the short pulses needed for conveying low-frequency information to occur with concomitant picture granularity. Second, echoes begin to appear at the sharp edges, being caused by ringing in the quantizer. Introduction of pseudo-random noise will dramatically reduce visibility of the granularity and edge echoes and thereby make possible use of increased gain to eliminate the edge blurring and slope overload.

OTHER EMBODIMENTS

Other embodiments of the invention are within the following claims. For example, a two channel system with the separate low channel eliminated and the middle channel carrying all low frequency information may be satisfactory in many circumstances. Use of the pseudo-random noise alone in either the high-frequency channel or in the DPCM loop without sharpening or companding, while not preferred, would still give an improved picture. In color image transmission, the luminance signal would ordinarily be coded using the invention, and where very accurate color reproduction is desired the chrominance signals could also be divided into separate low and high-frequency channels and coded using the invention. For moving images, the pseudo-random noise pattern would be varied between frames to eliminate the so-called "dirty window" effect that would be caused if the noise remained in the same spatial locations. The invention can also be applied to contour coding, wherein the average gradient computed in the sharpener would provide the edge position signal and the pseudo-random noise would be applied in quantizing the high-frequency amplitude signal. Finally, the invention is of course applicable to video tape recorders and other storage devices wherein no transmission link would appear.

INCORPORATION BY REFERENCE

Hereby incorporated by reference are the following documents: Roberts, L.G., "PCM Television Bandwidth Reduction Using Pseudo-Random Noise," Thesis, M.I.T. Department of Electrical Engineering, February 1961; Roberts, L.G., "Picture Coding Using Pseudo-Random Noise," IRE Transactions of the Professional Group on Information Theory, IT-8:2, February 1962; Curlander, P. J., "Image Enhancement Using Digital Adaptive Filtering," Thesis M.I.T. Department of Electrical Engineering, August 1977; Hoover, G. L., "An Image Enhancement/Transmission System," Thesis, M.I.T. Department of Electrical Engineering, May 1978.

What is claimed is:

1. Apparatus for coding a digital video signal, comprising:
    first means for processing said signal to produce a low-frequency component representative of luminance variations in a first spatial frequency band,
    second means for processing said signal to produce a high-frequency component representative of luminance variations in a second spatial frequency band above said first band, and
    third means for processing said components to produce a digitally-coded output signal, said third means comprising
    means for adding pseudo-random noise to said high-frequency component,
    means for quantizing the sum of said high-frequency component and said noise,
    said pseudo-random noise having a maximum peak-to-peak amplitude of one quantization level and a zero mean value, and
    means for sampling and quantizing said low-frequency component, said sampling being at a spatial rate lower than that associated with the output of said means for quantizing.

2. The apparatus of claim 1 further comprising apparatus for decoding, comprising
    means for subtracting said pseudo-random noise from said high-frequency component, and
    means for combining said low and high-frequency components to reconstruct said video signal.

3. Apparatus for coding a digital video signal, comprising:
    first means for processing said signal to produce a low-frequency component representative of luminance variations in a first spatial frequency band,
    second means for processing said signal to produce a high-frequency component representative of luminance variations in a second spatial frequency band above said first band, and
    third means for processing said components to produce an output signal, said third means comprising
    means for adding pseudo-random noise to said high-frequency component,
    means for quantizing the sum of said high-frequency component and said noise,
    said pseudo-random noise having a maximum peak-to-peak amplitude of one quantization level and a zero mean value,
    means for sampling said low-frequency component said sampling being at a spatial rate lower than that associated with the output of said means for quantizing,
    means for quantizing said low-frequency component more finely than said quantization of said high-frequency component, to reduce spurious contours, and
    means for compressing said high-frequency component, said means for compressing being selected to cause noise introduced by said third means to be more uniformly visible in both low and high contrast image areas.

4. The apparatus of claim 2 wherein said apparatus for decoding further comprises means for reconstructing said sampled low-frequency component.

5. The apparatus of claim 1 or 3 wherein
    said first means for processing comprises a first low-pass filter, and
    said second means for processing comprises
    means for reconstructing said subsampled low-frequency component and
    means for forming the difference between said video signal and said low-frequency component.

6. The apparatus of claim 1 further comprising means for compressing said high-frequency component, said means for compressing being selected to cause noise introduced by said third means to be more uniformly visible in both low and high contrast image areas.

7. The apparatus of claim 6 or 3 wherein said means for compressing said high-frequency component amplifies said component substantially in proportion to the square root of the magnitude of said component.

8. The apparatus of claim 2 further comprising
means for compressing said high frequency component, said means for compressing being selected to cause noise introduced by said third means for processing to be more uniformly visible in both low and high contrast image areas, and
means in said decoding apparatus for expanding said compressed signal downstream of said means for substracting said pseudo-random noise and upstream of said means for combining,
said means for expanding being complementary to said means for compressing.

9. The apparatus of claim 1, 6 or 3 further comprising additional means for compressing said video signal upstream of said first and second means for processing, said additional means being selected to cause quantizing noise introduced by said third means to be more uniformly visible to both light and dark image areas.

10. The apparatus of claim 9 wherein said additional means for compressing amplifies said video signal to convert it from the luminance scale to the lightness scale.

11. The apparatus of claim 8 further comprising
additional means for compressing said video signal upstream of said first and second means for processing,
said additional means being selected to cause quantizing noise introduced by said third means to be more uniformly visible in image areas of all luminance levels, and
further means in said decoding apparatus downstream of said means for combining for expanding said compressed signal,
said further means for expanding being complementary to said additional means for compressing.

12. The apparatus of claim 1, 6 or 3 further comprising sharpening means for amplifying and attenuating said high-frequency component to alter the sharpness of the image.

13. The apparatus of claim 12 wherein said sharpening means comprises:
first detecting means for detecting the local average magnitude of contrast in the image and
first proportioning means for proportioning the degree of amplification and attenuation to said local average contrast,
said first proportioning means providing the greatest attenuation for zero average contrast and proportionately less attenuation and more amplification for increasing contrast in a first contrast range,
said first proportioning means providing uniform amplification for contrast in a second contrast range above said first range,
said first proportioning means providing proportionately less amplification with increasing contrast in a third contrast range above said second range, and
said first proportioning means providing unity amplification for contrast in a fourth contrast range above said third range.

14. The apparatus of claim 13 wherein said sharpening means further comprises:
second detecting means for detecting the local luminance in the image and
second proportioning means for proportioning the degree of amplification and attenuation to said luminance,
said second proportioning means providing the greatest attenuation and least amplification for zero luminance and proportionately less attenuation and more amplification for increasing luminance.

15. The apparatus of claim 12 further comprising
fourth means for processing said video signal to produce a middle-frequency component representative of luminance variations in a third spatial frequency band above said first band and below said second band, thereby allowing the frequency dividing said second and third bands to be selected to optimize performance of said sharpening means.

16. Apparatus for decoding a digital video signal coded by the apparatus of claim 1, said apparatus comprising;
means for subtracting said pseudo-random noise from said high-frequency component and
means for combining said low and high-frequency components to reconstruct said video signal.

17. Apparatus for decoding a digital video signal coded by the apparatus of claim 6 or 3, said apparatus comprising:
means for subtracting said pseudo-random noise from said high-frequency component,
means for expanding said high-frequency component downstream of said means for subtracting,
said means for expanding being complementary to said means for compressing in said coding apparatus, and
means for combining said low and high-frequency components to reconstruct said video signal.

18. The apparatus of claim 17 further comprising means for expanding said video signal downstream of said means for combining.

19. The apparatus of claims 2 or 16 further comprising means for half-tone printing said reconstructed video signal.

20. The apparatus of claim 5 wherein
said video signal represents a digitized luminance value for each of a multiplicity of image elements and
said first low-pass filter averages luminance levels of surrounding image elements within a radius of 4 elements.

21. The apparatus of claim 15 wherein
said first means for processing comprises a first low pass filter for operating on said video signal to form said low-frequency component,
said fourth means for processing comprises
first difference means for forming a first difference signal representative of the difference between said video signal and said low-frequency component,
a second low-pass filter for operating on said first difference signal to form said middle-frequency component, and
said second means for processing comprises a second difference means for forming said high-frequency component from the difference between said first difference signal and said middle-frequency component.

22. The apparatus of claim 21 further comprising middle-frequency level scaling means, said means comprising
means for detecting the local average level of the image and
means for attenuating said middle-frequency component in proportion to said local average level, said means for attenuating providing the greatest attenuation for zero average level and proportionately less attenuation for increasing level.

23. The apparatus of claim 15 wherein said third means for processing further comprises:
   means for adding pseudo-random noise to said middle-frequency component
   means for quantizing the sum of said middle-frequency component and said noise,
   said pseudo-random noise having a maximum peak-to-peak amplitude of one quantization level and a zero mean value.

24. The apparatus of claim 23 wherein said third means for processing further comprises means for subsampling said middle-frequency component.

25. The apparatus of claim 24 further comprising means for compressing said middle-frequency component, said means for compressing being selected to cause noise introduced by said third means for processing to be substantially equally visible in both low and high contrast image areas.

26. The apparatus of claim 1 further comprising
   fourth means for processing said video signal to produce a middle-frequency component representative of luminance variations in a third spatial frequency band above said first band and below said second band.

27. The apparatus of claim 1 or 3 further comprising means for providing an output corresponding to said quantized low-frequency component without the addition of pseudo-random noise thereto.

28. Apparatus for coding a digital video signal, comprising:
   first means for processing a difference signal to produce an output signal, comprising
      means for adding pseudo-random noise to said difference signal and
      means for quantizing the sum of said difference signal and said noise,
   second means for processing said output signal to produce a predicted signal, comprising
      means for subtracting said pseudo-random noise from said output signal and
      means for filtering the difference between said output signal and said noise, and
   third means for forming said difference signal by subtracting said predicted signal from said video signal.

29. The apparatus of claim 28 wherein
   said first means further comprises means for compressing said difference signal upstream of said means for adding,
      said means for compressing being selected to cause noise introduced by said first means to be substantially equally visible in both low and high contrast image areas, and
   said second means further comprises means for expanding said output signal downstream of said means for subtracting and upstream of said means for filtering,
      said means for expanding being complementary to said means for compressing.

30. The apparatus of claim 29 further comprising apparatus for decoding, including:
   means for subtracting said pseudo-random noise from said output signal,
   means for expanding the difference between said output signal and said noise,
      said means for expanding being identical to said means for expanding in said coding apparatus, and
   means for filtering the output of said means for expanding,
      said means for filtering being identical to said means for filtering in said coding apparatus.

31. The apparatus of claim 30 further comprising
   additional means for compressing said video signal upstream of said third means, said additional means for compressing being selected to cause quantization noise introduced by said first means to be more uniformly visible in both light and dark image areas, and
   further means for expanding the output of said means for filtering in said decoding apparatus,
   said further means for expanding being complementary to said additional means for compressing.

32. Apparatus for decoding a digital video signal coded by the apparatus of claim 28, comprising:
   means for subtracting said pseudo-random noise from said output signal.
   means for expanding the difference between said output signal and said noise, and
   means for filtering the output of said means for expanding to produce said predicted signal.

33. The apparatus of claim 32 further comprising means for expanding the output of said means for filtering, said expanding being complementary to compressing performed in coding said video signal.

34. Apparatus for coding a digital video signal, comprising:
   first means for processing said signal to produce a low-frequency component representative of luminance variations in a first spatial frequency band,
   second means for processing said signal to produce a high-frequency component representative of luminance variations in a second spatial frequency band above said first band, and
   third means for processing said components to produce an output signal, said third means comprising
      means for adding pseudo-random noise to said high-frequency component,
      means for quantizing the sum of said high-frequency component and said noise,
      said pseudo-random noise having a maximum peak-to-peak amplitude of one quantization level and a zero mean value, and
   sharpening means for amplifying and attenuating said high-frequency component to alter the sharpness of the image, said sharpening means comprising
      first detecting means for detecting the local average magnitude of contrast in the image and
      first proportioning means for proportioning the degree of amplification and attenuation to said local average contrast,
      said first proportioning means providing the greatest attenuation for zero average contrast and proportionately less attenuation and more amplification for increasing contrast in a first contrast range,
      said first proportioning means providing uniform amplification for contrast in a second contrast range above said first range,
      said first proportioning means providing proportionately less amplification with increasing contrast in a third contrast range above said second range, and
      said first proportioning means providing unity amplification for contrast in a fourth contrast range above said third range.

* * * * *